No. 632,945. Patented Sept. 12, 1899.
M. A. KNAPP.
ADJUSTABLE TOOTH BAND.
(Application filed June 6, 1899.)
(No Model.)
FIG. 7.
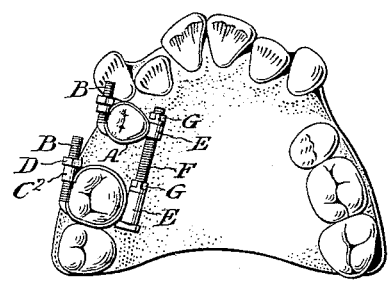
FIG. 4. FIG. 3. FIG. 1.
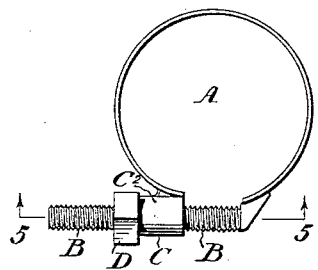
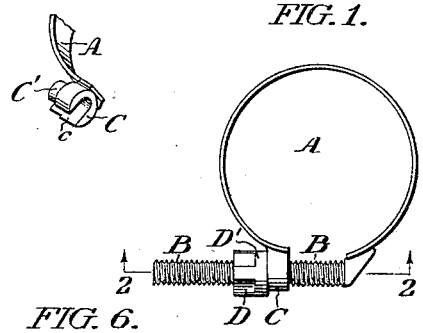
FIG. 5. FIG. 6. FIG. 2.
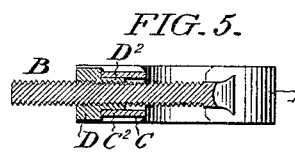
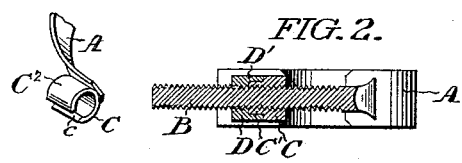
FIG. 8.
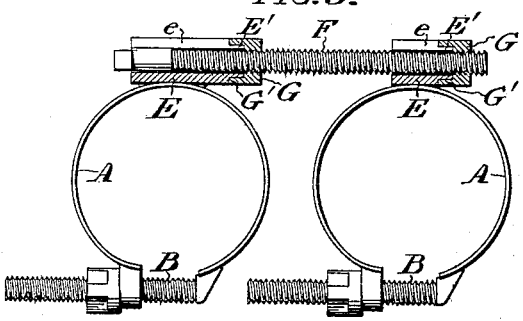
WITNESSES: INVENTOR:
Miland A. Knapp,
by Edward F. Simpson, Jr.
Attorney.
THE NORRIS PETERS CO., PHOTO-LITHO., WASHINGTON, D. C.

UNITED STATES PATENT OFFICE.

MILAND A. KNAPP, OF MINNEAPOLIS, MINNESOTA.

ADJUSTABLE TOOTH-BAND.

SPECIFICATION forming part of Letters Patent No. 632,945, dated September 12, 1899.

Application filed June 6, 1899. Serial No. 719,550. (No model.)

*To all whom it may concern:*

Be it known that I, MILAND A. KNAPP, a citizen of the United States, residing at Minneapolis, in the county of Hennepin and State of Minnesota, have invented a certain new and useful Improvement in Adjustable Tooth-Bands; and I do hereby declare the following to be a full, clear, and exact description of the invention, such as will enable others skilled in the art to which it appertains to make and use the same.

My invention relates to adjustable tooth-bands for encircling teeth in the human mouth, and particularly designed to be used in connection with or form part of appliances for regulating or correcting irregular teeth, although it may be used as a matrix and also for other dental purposes.

Adjustable tooth-bands as usually made consist of a thin metal strip having a screw secured to one end and a perforated lug forming a socket secured upon the other end. The screw is adapted to pass through the socket-lug and a nut on the screw bearing against the socket-lug serves to enlarge or reduce the diameter of the band according to the direction in which the nut is turned. One objection to this form of adjustable band is that when it is desired to straighten out the band or to put the same together it is necessary to remove the nut in order that the screw may be inserted or withdrawn from the socket-lug, as the case may be.

The object of my present invention is to overcome this objection; and to this end my invention consists in slotting the lug forming the socket and providing a detachable interlocking connection between the same and the nut, whereby, whenever desired, the screw may be engaged with or disengaged from the socket-lug without removing the nut from the screw.

With the aid of the accompanying drawings I will first describe my invention and afterward specifically point out the improvement in the claims at the end of this specification.

In said drawings, Figure 1 is a plan view of one of my improved adjustable tooth-bands of the preferred form on a considerably enlarged scale. Fig. 2 is a section thereof through the screw on the line 2 2 of Fig. 1. Fig. 3 is a perspective detail view of the slotted socket-lug of the preferred form of my improved adjustable tooth-band. Figs. 4, 5, and 6 are views corresponding, respectively, with Figs. 1, 2, and 3 of a modified form of adjustable tooth-band. Fig. 7 is a plan view of a human denture having irregular teeth and showing two of my improved bands employed as teeth-regulators. Fig. 8 is a longitudinal sectional view of the tension-rod or T-bar forming part of the teeth-regulating appliance shown in Fig. 7.

The band A, as usual, consists of a strip of some suitable metal sufficiently thin and flexible for the purpose intended. To one of its ends is secured a screw B, while to its opposite end is secured a perforated lug C, forming the socket through which said screw passes when the band is formed into a loop, as shown. The socket-lug C is slotted at $c$, (see Fig. 3,) the slot opening into the socket of the lug. In the preferred form of band shown in Figs. 1, 2, and 3 the socket-lug is formed with a reduced annular portion $C'$. A nut D is fitted upon the screw B and is provided with an annular flange or collar $D'$, adapted to fit upon and encircle the reduced annular portion $C'$ of the socket-lug C, thus forming a detachable interlocking connection between said nut and said socket-lug. By this construction it will be observed the screw B may be engaged with or disengaged from the socket-lug without removing the nut D, it simply being necessary when engaging the parts to pass the screw laterally through the slot $c$ into the socket-lug and screw or move the nut to cause its collar to embrace the annular reduced portion of the lug, and when disengaging the parts to withdraw the nut from the lug and laterally remove the screw from the socket.

The modified form of adjustable band shown in Figs. 4, 5, and 6 is similar to the preferred form just described, with the exception that the nut D instead of the socket-lug is provided with a reduced annular portion $D^2$, adapted to enter a collar $C^2$, formed on the socket-lug C. The principle and operation in the two forms are identical, the only difference being that in one instance the nut embraces the socket-lug, while in the other instance the nut enters or is embraced by the socket-lug.

So far as described the improved adjustable band may be used in connection with teeth-regulating appliances, may be employed as a dental matrix, or used for other dental purposes. When used with teeth-regulating appliances, the band may be provided with a perforated lug E, secured upon the outside of the band opposite its open side. The purpose of this lug is to provide a seat for one end of a tension-rod or T-bar F.

In Fig. 7 two of my improved adjustable tooth-bands, each having one of said lugs or seats E, are shown secured upon teeth which they encircle. A tension-rod or T-bar F connects the two bands, the opposite ends of said rod being secured to the bands by way of their respective lugs or seats. (See also Fig. 8.) The tension-bar is screw-threaded practically throughout its entire length and has screwed upon it nuts G G for the purpose of producing the proper tension on the bands for securing the desired regulation of the teeth to which the bands are attached, as will be understood by those familiar with the art of dentistry. The connection between the tension-bar and its nuts and the bands is similar to the connection between the screw-nut and socket-lug of the preferred form of adjustable band shown in Figs. 1, 2, and 3—that is to say, each of the perforated lugs or seats E E of the bands is slotted at $e$ $e$ and provided with reduced annular portions E' E', and each of the tension-bar nuts G G is provided with an annular flange or collar G' G' for embracing said annular portions E' E'. In this way not only can the individual bands be quickly and easily fitted upon teeth in the mouth of a patient without removing the clamp-nuts, but after said bands have been so secured the tension-bar may similarly be quickly and easily slipped in place in the lugs or seats of the bands without removing the nuts from said tension-bar.

My improvement not only facilitates the application, adjustment, and removal of adjustable tooth-bands, but in addition, by the preferred construction, involving the clamp-nut having an annular flange or collar which embraces the socket-lug, I attain a stronger, steadier, and more secure connection between the parts than heretofore.

It will of course be understood that any suitable or well-known connection or appliance for regulating teeth may be employed in conjunction with my improved bands in lieu of the tension-rod or T-bar and its perforated lug or seat E.

I claim as my invention—

1. As a new article of manufacture an adjustable tooth-band consisting of a strip of thin metal having a screw secured to one end and a slotted socket-lug secured to its other end, and a nut on said screw having detachable interlocking connection or engagement with said slotted socket-lug, substantially as and for the purpose set forth.

2. As a new article of manufacture an adjustable tooth-band consisting of a strip of thin metal having a screw secured to one end and a slotted socket-lug secured to its other end, said lug having a reduced annular portion, and a nut on said screw having an annular flange or collar adapted to engage and embrace the reduced annular portion of said socket-lug, substantially as and for the purpose set forth.

3. The combination, with an adjustable tooth-band having means for connecting its opposite ends and provided with a slotted socket or seat having a reduced annular portion, of a tension-rod adapted to fit in said slotted socket lug or seat and having a nut provided with an annular flange or collar adapted to engage and embrace the reduced annular portion of said slotted socket lug or seat, substantially as and for the purpose described.

In testimony whereof I affix my signature in presence of two witnesses.

MILAND A. KNAPP.

Witnesses:
 F. L. PALMER,
 F. H. RING.